United States Patent [19]

Owens

[11] 4,368,639
[45] Jan. 18, 1983

[54] LIQUID TANK GAUGE

[76] Inventor: Donald R. Owens, 204 Burnett, Baytown, Tex. 77520

[21] Appl. No.: 188,786

[22] Filed: Sep. 19, 1980

[51] Int. Cl.³ ............................................. G01F 23/18
[52] U.S. Cl. ....................................... 73/301; 73/292
[58] Field of Search ................. 73/301, 299, 291, 292, 73/295

[56] References Cited

U.S. PATENT DOCUMENTS

| | | | |
|---|---|---|---|
| 3,092,916 | 6/1963 | Kendziorek et al. | 73/301 X |
| 3,398,394 | 8/1968 | Luehrmann et al. | 73/299 X |
| 3,473,379 | 10/1969 | Stephens et al. | 73/301 |
| 3,653,262 | 4/1972 | Ehrenfried et al. | 73/292 |
| 4,084,435 | 4/1978 | Weik et al. | 73/299 |

Primary Examiner—Daniel M. Yasich
Attorney, Agent, or Firm—Fulbright & Jaworski

[57] ABSTRACT

A liquid gauge for measuring liquid level in a container having a differential pressure transducer positioned in the liquid. The transducer has a first port exposed to liquid adjacent the bottom of the container and a second port in communication with the environment above the liquid. The gauge may include a water level detector and a temperature measuring transducer. The gauge will measure the hydrostatic pressure of the liquid which is a determination of the liquid level and/or volume.

5 Claims, 3 Drawing Figures

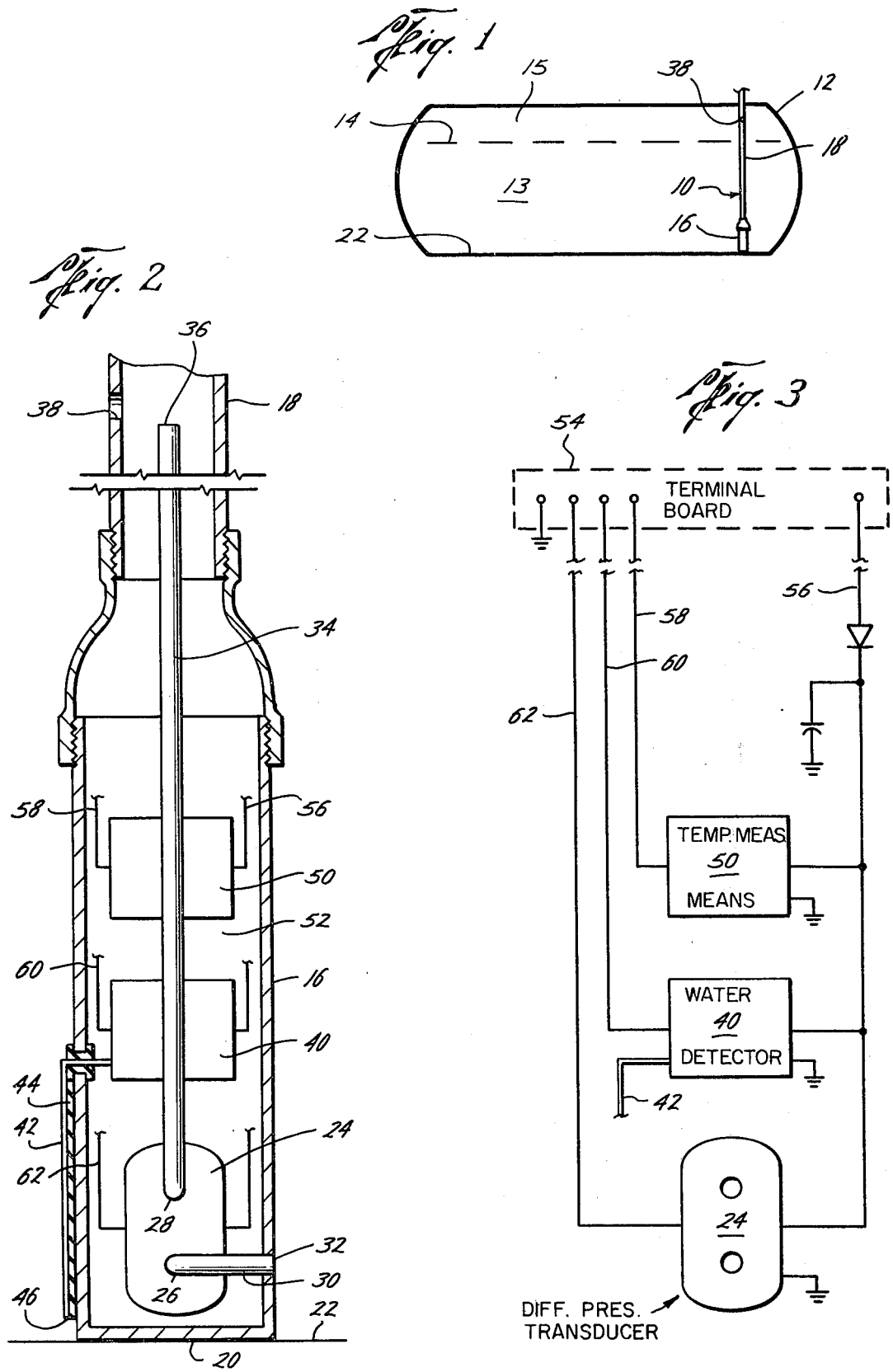

LIQUID TANK GAUGE

BACKGROUND OF THE INVENTION

The measurement of liquid levels and/or volumes of a petrochemical liquid such as gasoline, diesel fuel, kerosene, etc., are commonly performed by inserting a measuring stick into the tank or liquid container. The present invention is directed to provide an improved liquid tank gauge utilizing an electronic gauge for providing a more convenient and accurate measurement along with optional temperature and water detection features.

SUMMARY

The present invention is directed to an electronic liquid gauge for measuring liquid level in a container including a differential pressure transducer positioned in the liquid in the container in which the transducer has first and second pressure input ports. The first port is exposed to liquid in the container and is positioned adjacent the bottom of the container and is preferably vertically positioned a known distance above the bottom. A tubing is connected to the second port in communication with the environment above the liquid. The pressure transducer will measure the hydrostatic pressure of the liquid which is a measurement of the liquid level and/or volume of the liquid in the container regardless of whether the container is pressurized or at atmospheric pressure.

A still further object of the present invention is the provision of a liquid gauge having a housing adapted to be positioned in the liquid and contacting the bottom of the liquid container. A differential pressure transducer is positioned in the housing. The transducer has first and second pressure input ports and the first port is vertically positioned a known distance above the bottom of the housing and communicates with the exterior of the housing. A conduit is connected to the housing and is adapted to extend above the liquid level in the container. A tubing is connected to the second port and extends through the conduit for communication with the environment above the liquid. Electrical connections to the transducer extend from the housing through the conduit.

Yet a still further object of the present invention is the provision of a water level detector positioned in the housing for detecting water which may accumulate beneath a petrochemical liquid. Preferably, the detector is positioned a predetermined vertical distance above the bottom of the housing for detecting a predetermined water level. The water level detector may include an electrode connected to the housing and spaced a predetermined distance above the bottom of the housing.

Still a further object of the present invention is the provision of a temperature measuring means positioned in the housing for measuring the temperature of the liquid.

Other and further objects, features and advantages will be apparent from the following description of a presently preferred embodiment of the invention, given for the purpose of disclosure and taken in conjunction with the accompanying drawings.

BRIEF DESCRIPTION OF THE DRAWINGS

FIG. 1 is an elevational view of the liquid gauge of the present invention in position in a tank, FIG. 2 is an enlarged elevational view, partly in cross section, of the liquid gauge of the present invention, and FIG. 3 is a block diagram of the electrical circuit of the present invention.

BRIEF DESCRIPTION OF THE PREFERRED EMBODIMENT

Referring now to the drawings, and particularly to FIG. 1, the reference numeral 10 generally indicates the liquid level gauge of the present invention inserted into any suitable container or tank 12 such as one containing a petrochemical 13, such as gasoline, diesel fuel, or kerosene, and having a liquid level 14. The gauge 10 generally includes a housing 16 and a conduit 18.

Referring now to FIGS. 1 and 2, the housing 16 may be of any suitable shape such as a cylindrical housing having a bottom 20 whereby the housing may be positioned in the liquid 13 contacting the bottom 22 of the tank 12. A differential pressure transducer 24, such as Model No. X70477-PC of Petronics, Inc., is positioned in the housing 16. The differential pressure transducer 24 includes a first pressure input port 26 and a second pressure input port 28. The first port 26 is positioned adjacent the bottom 20 of the housing 16, but preferably is vertically positioned a known position above the bottom 20 so as to be vertically positioned a known distance above the bottom 22 of the tank 12 for measurement purposes while avoiding any debris which may accumulate on the bottom 22 of the tank 12. Preferably, the port 26 is in communication with the liquid 13 through a passageway 30 connected to an opening 32 in the housing 16. A tubing 34 is connected to the second port 28 and extends upwardly through the conduit 18 so as to be in communication with the environment 15 in the tank 12 above the liquid level 14. For convenience, the upper end 36 of the tubing 34 may be in communication with the environment 15 through a hole 38 in the conduit 18. Thus, the pressure transducer 24 by measuring the pressure above and below the liquid 13 will measure the hydrostatic pressure of the liquid 13 which is a measure of the liquid level 14 and/or the volume of the fluid 13 in the tank 12. It is noted that the differential pressure transducer 24 will measure the liquid level whether the tank 12 is under pressure or subject to atmospheric pressure.

In fuel tanks it is also desirable to know whether water has accumulated in the bottom of the tank 12 and the amount of such water accumulation. This is desirable for measurement purposes as well as insuring that water is not pumped out of the tank 12 along with the fuel. Therefore, a water detector module 40 may be provided for detecting any accumulated water in the tank 12. The module 40 is positioned in the housing 16 and may include a conductive electrode 42 which is suitably attached to the exterior of the housing 16 and insulated thereby by any suitable insulation 44. The lower end 46 of the probe 42 may be positioned spaced from the bottom 20 of the housing 16 at any suitable distance, for example, one inch. Thus, when water accumulates in the tank 12 up to the one inch level it will contact the electrode 42 and activate the water level detector 40, which may be Model CS166 of the Cherry Smith Company.

In addition, a suitable temperature measuring means 50 may be provided for measuring the temperature of the liquid 13. One suitable temperature measuring means is a temperature sensitive zener diode such as Model LM335 sold by National Conductor. Other types, such as thermistors may be uitlized. Preferably, the interior 52 of the housing 16 is suitably potted with a waterproof compound.

Referring now to FIG. 3 a block diagram of the electrical schematic of the gauge 10 is best seen which includes a terminal board 54 exteriorly of the tank 12 having electrical lines 56, 58, 60 and 62 which extend through the conduit 18 to the various components in the housing 16. Thus, line 56 provides the power to the temperature measuring means 50, the water level detector 40, and the differential pressure transducer 24. Line 58 is the output signal from the temperature measuring means 50, line 60 is the output signal from the water level detector 40, and line 62 is the signal from the pressure transducer 24.

The signals from lines 58, 60 and 62 may be connected to suitable and conventional measuring equipment from which the appropriate readings can be made to determine the fluid level and/or volume of the liquid 13 in the tank 12.

The present invention, therefore, is well adapted to carry out the objects and attain the ends and advantages mentioned as well as others inherent therein. While a presently preferred embodiment of the invention is given for the purpose of disclosure, numerous changes in the details of construction and arrangement of parts may be made which will readily suggest themselves to those skilled in the art and which are encompassed within the spirit of the invention and the scope of the appended claims.

What is claimed is:

1. A liquid gauge for measuring liquid level in a container comprising,
    a housing having an opening adapted to be positioned in the liquid in the container and contacting the bottom of the container,
    a differential pressure transducer for measuring the hydrostatic pressure of said liquid and positioned in the housing, said transducer having first and second pressure input ports,
    said first port vertically positioned from the bottom of the transducer a selected known distance above the bottom of the housing, the housing including an opening in a well connected to a conduit communicating with the first port,
    a conduit connected to the housing and adapted to extend above the liquid level in the container,
    a tubing connected to the second port and extending through the conduit for communication with the environment above the liquid, and
    electrical connections to the transducer extending through the conduit.

2. A liquid gauge for measuring liquid level in a container comprising,
    a housing having an opening adapted to be positioned in the liquid in the container and contacting the bottom of the container,
    a differential pressure transducer for measuring the hydrostatic pressure of said liquid and positioned in the housing, said transducer having first and second pressure input ports,
    said first port vertically positioned from the bottom of the transducer a selected known distance above the bottom of the housing, the housing including an opening in a wall connected to a conduit communicating with the first port,
    a conduit connected to the housing and adapted to extend above the liquid level in the container,
    a tubing connected to the second port and extending through the conduit for communication with the environment above the liquid,
    electrical connections to the transducer extending through the conduit,
    a water level detector positioned in the housing for detecting water in said liquid in the container, said detector positioned a predetermined vertical distance above the bottom of the housing.

3. A liquid gauge for measuring the liquid level of a petrochemical liquid in a container comprising,
    a housing having an opening adapted to be positioned in the liquid in the container and contacting the bottom of the container,
    a differential pressure transducer for measuring the hydrostatic pressure of said liquid positioned in the housing, said transducer having first and second pressure input ports,
    said first port vertically positioned from the bottom of the transducer a selected known distance above the bottom of the housing and communicating with the opening in a wall connected to a conduit with the exterior of the housing,
    a conduit connected to the housing and adapted to extend above the liquid level in the container,
    a tubing connected to the second port and extending through the conduit for communication with the environment above the liquid,
    a water level detector positioned in the housing for detecting water in the container, and
    electrical connections to the transducer and detector extending through the conduit.

4. A liquid gauge for measuring the liquid level of a peatrochemical liquid in a container comprising,
    a housing having an opening adapted to be positioned in the liquid in the container,
    a differential pressure transducer for measuring the hydrostatic pressure of said liquid and positioned in the housing, said transducer having first and second pressure input ports,
    said first port vertically positioned from the bottom of the transducer a selected known distance above the bottom of the housing and the housing having an opening in a wall connected to a conduit communicating with the first port,
    a conduit connected to the housing and adapted to extend above the liquid in the container,
    a tubing connected to the second port and extending through the conduit for communication with the environment above the liquid,
    a conductive electrode connected to the housing and exposed to the liquid in the container,
    an electrical power supply connected to the electrode, and
    a fluid level detector in the housing connected to the electrode for measuring the fluid level of a petrochemical liquid.

5. The apparatus of claim 4 wherein the electrode is spaced a predetermined distance above the bottom of the housing.

* * * * *